(12) United States Patent
Haldeman

(10) Patent No.: US 7,393,584 B2
(45) Date of Patent: Jul. 1, 2008

(54) MULTIPLE LAYER LAMINATE WITH MOISTURE BARRIER

(75) Inventor: Steven Vincent Haldeman, Hampden, MA (US)

(73) Assignee: Solutia Incorporated, St. Louis, MO (US)

( * ) Notice: Subject to any disclaimer, the term of this patent is extended or adjusted under 35 U.S.C. 154(b) by 268 days.

(21) Appl. No.: 11/035,010

(22) Filed: Jan. 14, 2005

(65) Prior Publication Data

US 2006/0159912 A1  Jul. 20, 2006

(51) Int. Cl.
*B32B 17/10* (2006.01)
*B32B 27/34* (2006.01)
*B32B 27/36* (2006.01)
*B32B 27/40* (2006.01)

(52) U.S. Cl. .................. 428/336; 428/412; 428/425.6; 428/437; 428/442; 428/451

(58) Field of Classification Search ................ 428/437, 428/336, 412, 425.6, 442, 451
See application file for complete search history.

(56) References Cited

U.S. PATENT DOCUMENTS

| | | | |
|---|---|---|---|
| 3,900,673 A | 8/1975 | Mattimoe et al. | |
| 4,059,469 A | 11/1977 | Mattimoe et al. | |
| 4,072,779 A | 2/1978 | Knox et al. | |
| 4,115,622 A | 9/1978 | Cartier | |
| 4,242,403 A | 12/1980 | Mattimoe et al. | |
| 4,469,743 A | 9/1984 | Hiss | |
| 4,557,980 A | 12/1985 | Hodnett, III | |
| 4,584,229 A | 4/1986 | Bourelier et al. | |
| 4,709,991 A | 12/1987 | Hoshikawa | |
| 4,952,457 A | 8/1990 | Cartier et al. | |
| 4,956,227 A | 9/1990 | Hirayama et al. | |
| 5,091,258 A | 2/1992 | Moran | |
| 5,110,637 A | 5/1992 | Ando et al. | |
| 5,145,744 A | 9/1992 | Cartier et al. | |
| 5,153,054 A | 10/1992 | Depauw et al. | |
| 5,332,888 A | 7/1994 | Tausch et al. | |
| 5,399,435 A | 3/1995 | Ando et al. | |
| 5,415,942 A | 5/1995 | Anderson | |
| 5,487,939 A | 1/1996 | Phillips et al. | |
| 5,514,485 A | 5/1996 | Ando et al. | |
| 5,567,529 A | 10/1996 | Smith | |
| 5,763,089 A | 6/1998 | Chaussade et al. | |
| 5,846,363 A | 12/1998 | Haverkamp | |
| 6,045,896 A | 4/2000 | Boire et al. | |
| 6,068,914 A | 5/2000 | Boire et al. | |

(Continued)

FOREIGN PATENT DOCUMENTS

EP  1394271  4/1972

(Continued)

OTHER PUBLICATIONS

XP-002380520 WPI/Derwent Abstract of JP 03 114825, May 16, 1991, Nippon Monsanto KK.

*Primary Examiner*—D. S. Nakarani
(74) *Attorney, Agent, or Firm*—Brenc Law (57) ABSTRACT

The present invention is in the field of multiple layer glass panels having multiple polymer layers disposed thereon, and more specifically, the present invention is in the field of multiple pane windows having multiple polymer layers disposed thereon wherein a moisture barrier layer is included.

30 Claims, 2 Drawing Sheets

U.S. PATENT DOCUMENTS

| | | |
|---|---|---|
| 6,265,076 B1 | 7/2001 | McCurdy et al. |
| 6,322,881 B1 | 11/2001 | Boire et al. |
| 6,340,529 B1 | 1/2002 | Ebisawa et al. |
| 6,451,434 B1 | 9/2002 | Ebisawa et al. |
| 6,472,072 B1 | 10/2002 | Ebisawa et al. |
| 6,541,133 B1 | 4/2003 | Schicht et al. |
| 6,562,490 B2 | 5/2003 | Ebisawa et al. |
| 6,582,809 B2 | 6/2003 | Boire et al. |
| 6,610,410 B2 | 8/2003 | Ebisawa et al. |
| 6,680,134 B2 | 1/2004 | Maurer et al. |
| 6,699,585 B2 | 3/2004 | Ebisawa et al. |
| 2002/0022132 A1 | 2/2002 | Ebisawa et al. |
| 2002/0034641 A1 | 3/2002 | Ebisawa et al. |
| 2002/0045037 A1 | 4/2002 | Boire et al. |
| 2002/0094407 A1 | 7/2002 | Frost et al. |
| 2002/0197459 A1 | 12/2002 | Maurer et al. |
| 2003/0143435 A1 | 7/2003 | Schicht et al. |
| 2003/0198808 A1 | 10/2003 | Muromachi et al. |
| 2004/0026397 A1 | 2/2004 | Degand |

FOREIGN PATENT DOCUMENTS

| | | |
|---|---|---|
| JP | 03 114825 | 5/1991 |
| WO | WO 01/43963 | 6/2001 |

MULTIPLE LAYER LAMINATE WITH MOISTURE BARRIER

FIELD OF THE INVENTION

The present invention is in the field of multiple layer glass panels having multiple polymer layers disposed thereon, and more specifically, the present invention is in the field of multiple pane windows having multiple polymer layers disposed thereon wherein a moisture barrier layer is included.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two panes of glass. Safety glass is often used to provide a transparent barrier in architectural and automotive openings. Its main function is to absorb energy, such as that caused by a blow from an object, without allowing penetration through the opening.

In many applications it is desirable to use only a single pane of glass onto which one or more layers of polymeric material are disposed to produce a multiple pane glass panel. In one simple form, a two layer poly(vinyl butyral)/polyester construct is disposed on a pane of glass with the poly(vinyl butyral) in contact with the glass, and the three layer panel is then laminated to produce a finished multiple layer glass panel, which is also known as a bilayer.

Such bilayers, however, are prone to delamination if subjected to certain environmental conditions, including the ingress of moisture through the polyester and into the poly (vinyl butyral). The ingress of water into the poly(vinyl butyral) layer can lead to delamination of the entire panel because the adhesion properties of the poly(vinyl butyral) are detrimentally impacted by increased water content.

Attempts to alleviate moisture ingress have included the use of poly(vinyl butyral) rather than polyurethane, the inclusion of additives into the poly(vinyl butyral) layer, and the specific adjustment of the molecular properties of the poly (vinyl butyral) to create a layer that is less prone to absorption and retention of water. These attempts have all resulted in varying degrees of success.

Accordingly, further improved compositions and methods of manufacture for improved multiple layer glass units having an exposed plastic surface are desired.

SUMMARY OF THE INVENTION

Now, according to the present invention, multiple pane glass panels incorporating multiple polymeric layers, at least one of which is exposed to the environment, are described. The inclusion of a barrier layer between the environment and an inner layer of polymer sheet ameliorates the degradation of the entire glass panel through delamination.

DETAILED DESCRIPTION

The present invention is directed to a multiple layer glass panel that has incorporated therein a moisture barrier layer. The moisture barrier layer functions to prevent or reduce the net increase of water content in a polymer sheet disposed in the glass panel. Without such protection, the multiple layer glass panel is subject to delamination caused by an increase in the moisture content of the polymer sheet, which can cause a reduction in the adhesion of that sheet to neighboring layers, which will typically be glass and a polymer film.

Figure 1:
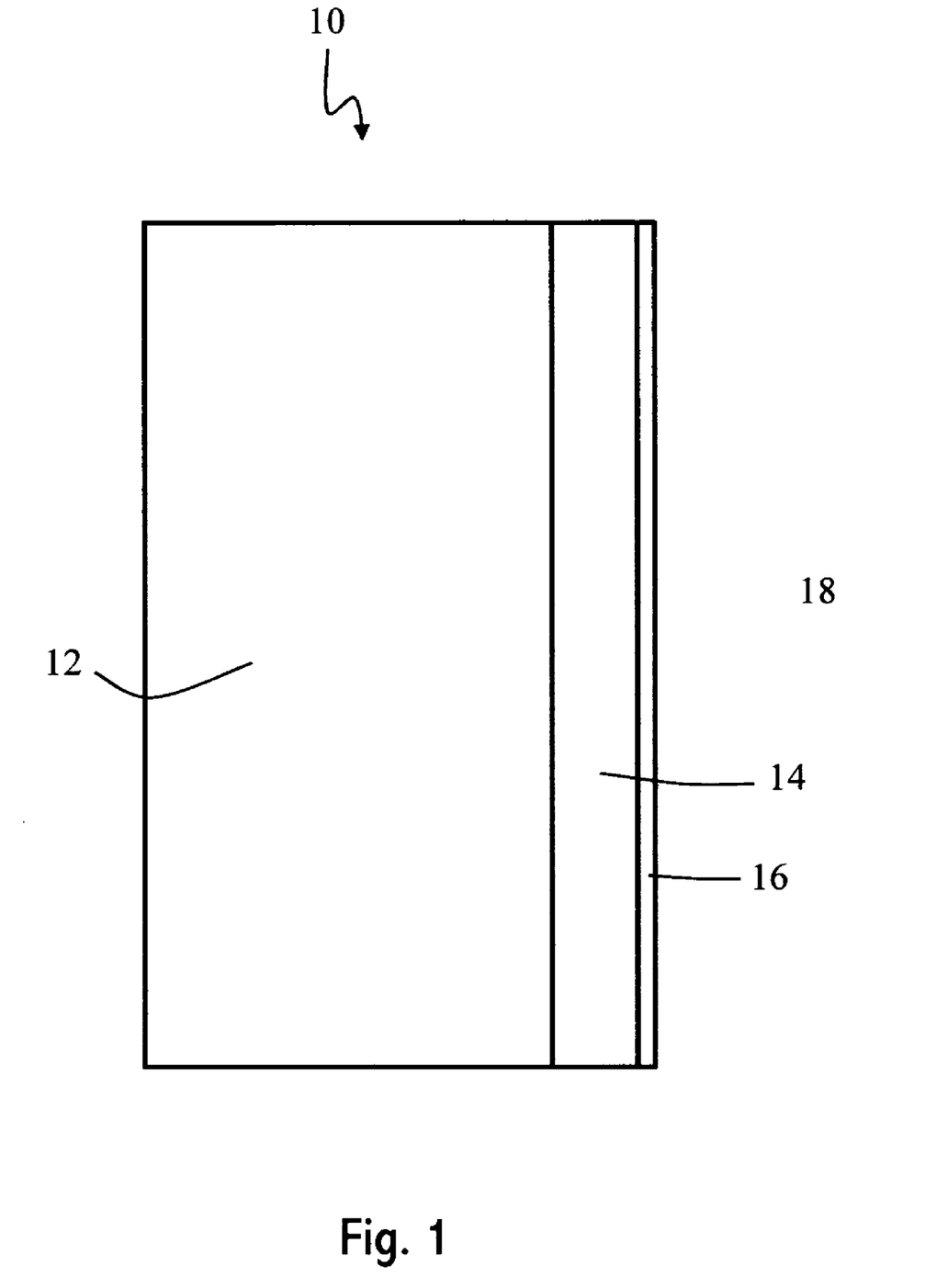
FIG. 1 is a schematic illustration of a multiple layer glass panel.

As shown in the schematic cross-section in FIG. 1 generally at 10, a conventional three layer glass panel has a pane of glass 12, a polymer sheet 14 disposed in contact with said pane of glass 12, and a polymer film 16 disposed in contact with the polymer sheet 14. The potentially humid environment to which the panel is exposed is shown as 18. A hardcoat layer (not shown) can be disposed in contact with the polymer film 16 opposite the polymer sheet 14. In this conventional configuration, high temperature and/or humidity conditions in the environment can cause movement of water vapor through the hardcoat, if applicable, through the polymer film 16, and into the polymer sheet 14, where it can accumulate and raise the moisture content of the polymer sheet 14. As will be described in detail below, the polymer sheet 14 can comprise many types of thermoplastics, and in particular, it can comprise, for example, poly(vinyl butyral). The polymer film 16, as will also be described in detail below, can also comprise various thermoplastics, and in particular, it can comprise, for example, poly(ethylene terephthalate). A typical arrangement, for example, can be—glass//poly(vinyl butyral)//poly (ethylene terephthalate)//hardcoat with the hardcoat optional. The type of arrangement shown in FIG. 1 is useful when conventional multiple glass panels having two panes of glass are not suitable for the application.

Another arrangement that can be used substitutes a different rigid substrate for the glass layer 12 shown in FIG. 1. In addition to plastics such as polycarbonate, the rigid substrate can be any conventional laminated panel, for example a three layer panel having the arrangement of—glass//poly(vinyl butyral)//glass. This would result in a final product having the configuration, for example—glass//poly(vinyl butyral)// glass//poly(vinyl butyral)//poly(ethylene terephthalate)// hardcoat with the hardcoat optional. In this configuration, the poly(vinyl butyral)//poly(ethylene terephthalate) serves as a spall shield.

According to the present invention, either of the above-described configurations can be modified by adding a moisture barrier layer on either or both sides of the polymer film 16. Together, the polymer film 16 and the moisture barrier layer, as used herein, constitute an "outer layer." If the moisture barrier layer is disposed on the polymer sheet side of the polymer film then the order of layers is rigid substrate//polymer sheet//moisture barrier layer//polymer film//hardcoat with the hardcoat optional. If, alternatively the moisture barrier layer is disposed on the hardcoat side of the polymer film, then the order is rigid substrate//polymer sheet//polymer film//moisture barrier layer//hardcoat with the hardcoat optional.

As used herein, "moisture barrier layer" means any layer that can be applied directly to the polymer film, or in some cases the polymer sheet, that is relatively thin, optically acceptable for use in a multiple layer panel, that is compatible with the other materials of the application, and that provides a "relative water ingress value," as determined according to the test described below, of less than 1.5%.

In various embodiments, the moisture barrier layers of the present invention have a relative water ingress value of less than 1.5%, less than 1.3%, less than 1.1%, and most preferably less than 1.0%.

In various embodiments, the moisture barrier layers of the present invention are relatively thin to provide the desired optical characteristics, and can be, for example, less than 100 nanometers in thickness. In preferred embodiments, the moisture barrier layers have a thickness of less than 30 nanometers, less than 25 nanometers, less than 20 nanometers, or less than 15 nanometers.

The moisture barrier layers of the present invention can comprise a member selected from the group consisting of indium oxide, indium tin oxide, aluminum oxide, silicon oxide, and mixtures and combinations thereof. In various embodiments the moisture barrier layers comprise a member selected from the group consisting of indium tin oxide, aluminum oxide, and silicon oxide. In various embodiments the moisture barrier layers comprise an oxynitride, and in various embodiments the moisture barrier layers comprise silicon oxynitride, aluminum oxynitride, or titanium oxynitride.

The moisture barrier layers can be applied to the polymer film, or in some cases the polymer sheet, using any conventional method, for example, sputtering or vapor deposition; further examples are given in the section entitled "polymer film."

In addition to the embodiments described above, further layers can be incorporated into the multiple layer constructs according to the application. For example, the rigid substrate layer can be modified to include as many or as few layers as desired, from a single pane of glass, to two or more panes of glass between which are disposed one or more polymer layers, for example, the construct polymer sheet//polymer film//polymer sheet. Further, additional layers can be added between the rigid substrate and the polymer sheet//outer layer (polymer film+moisture barrier layer), as appropriate. For example, an additional layer of poly(vinyl butyral) can be inserted between the polymer sheet//outer layer and the rigid substrate. In these embodiments, for example in a two polymer sheet embodiment, the polymer sheets can have different compositions, which can lead to desirable properties, for example, noise suppression or infrared or ultraviolet absorption. In further embodiments, the rigid substrate can be any conventional plastic or glass, and in particular embodiments, the glass can be tempered glass, the use of which would add greater strength to a window.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

The polymer film, such as element 16 shown in FIG. 1, can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film comprises materials such as re-stretched thermoplastic films having the noted properties, which include polyesters. In various embodiments, the polymer film comprises or consists of poly(ethylene terephthalate), and, in various embodiments, the polyethylene terephthalate has been biaxially stretched to improve strength, and/or has been heat stabilized to provide low shrinkage characteristics when subjected to elevated temperatures (e.g. less than 2% shrinkage in both directions after 30 minutes at 150° C.).

In various embodiments, the polymer film can have a thickness of 0.013 millimeters to 0.20 millimeters, 0.025 millimeters to 0.1 millimeters, or 0.04 to 0.06 millimeters. The polymer film can optionally be surface treated or coated with a functional performance layer to improve one or more properties, such as adhesion or infrared radiation reflection. These functional performance layers include, for example, a multilayer stack for reflecting infra-red solar radiation and transmitting visible light when exposed to sunlight. This multilayer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known (see, for example, U.S. Pat. Nos. 4,017,661 and 4,786,783), the metal layer(s) may optionally be electrically resistance heated for defrosting or defogging of any associated glass layers. Various coating and surface treatment techniques for poly(ethylene terephthalate) film and other polymer films that can be used with the present invention are disclosed in published European Application No. 0157030.

Hardcoats

Any suitable, conventional hardcoat can be used as a scratch resistant layer on the outer layer of multiple layer glass panels of the present invention. In particular, the hardcoats may be a combination of poly(silicic acid) and copolymers of fluorinated monomers, with compounds containing primary alcohols (as described in U.S. Pat. No. 3,429,845), or with compounds containing primary or secondary alcohols (as described in U.S. Pat. No. 3,429,846). Other abrasion resistant coating materials suitable for the purpose are described in U.S. Pat. Nos. 3,390,203; 3,514,425; and, 3,546,318.

Further examples of useful hardcoats include cured products resulting from heat or plasma treatment of a hydrolysis and condensation product of methyltriethoxysilane.

Hardcoats that are useful also include acrylate functional groups, such as a polyester, polyether, acrylic, epoxy, urethane, alkyd, spiroacetal, polybutadiene or polythiol polyene resin having a relatively low molecular weight; a (meth)acrylate oligomer or prepolymer of a polyfunctional compound such as a polyhydric alcohol; or a resin containing, as a reactive diluent, a relatively large amount of a monofunctional monomer such as ethyl (meth)acrylate, ethylhexyl (meth)acrylate, styrene, methylstyrene or N-vinylpyrrolidone, or a polyfunctional monomer such as trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate.

Polymer Sheet

The following section describes the various materials, such as poly(vinyl butyral), that can be used to form polymer sheets of the present invention.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

Specifically excluded from the definition of "polymer sheet" are adhesion layers that are applied in very thin layers for the purposes of adhesion only. These very thin layers that are applied for the purpose of adhering two non-adhering layers together (for example poly(ethylene terephthalate) and glass), are typically less than 0.2 millimeters in thickness, and can comprise poly(vinyl butyral) and similar type materials. In various embodiments of the present invention, the polymer sheet layer is between 0.25 to 3.0 millimeters, 0.25 to 1.0 millimeters, 0.25 to 0.5 millimeters, or 0.3 to 0.4 millimeters in thickness.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In other embodiments, the polymer sheet comprises plasticized poly(vinyl butyral). In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, the polymer sheet comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/m (see, for example, U.S. Pat. Nos. 4,902,464; 4,874,814; 4,814,529; 4,654,179) As used herein, the term "molecular weight" means the weight average molecular weight. Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Additives may be incorporated into the polymer sheet to enhance its performance in a final product. Such additives include, but are not limited to, the following agents: anti-blocking agents, plasticizers, dyes, pigments, stabilizers (e.g., ultraviolet stabilizers), antioxidants, flame retardants, IR absorbers, and combinations of the foregoing additives, and the like, as are known in the art.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a melted mixture of resin with a plasticizer and optionally other additives.

The poly(vinyl butyral) polymer and plasticizer additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives (hereinafter "melt") by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet.

The windows of the present invention can be manufactured by any method known in the art. In various embodiments, a single pane of glass and a multiple layer polymer are formed by stacking and then laminating the following layers: glass//polymer sheet//polymer film//glass. Lamination of this stack can be performed by any appropriate laminating process in the art, including known autoclave procedures. After lamination, the pane of glass that is in contact with the polymer film can be peeled off of the polymer film, leaving a single pane of glass having a polymer sheet disposed thereon and a polymer film disposed on the polymer sheet. In other embodiments, a rigid substrate other than glass can be used in place of the second layer of glass and removed after lamination. Examples include rigid plastics and metals.

The present invention also includes methods of manufacturing a pane of glass having disposed thereon any of the multiple layer polymers of the present invention comprising using a vacuum non-autoclave process. In various embodiments of the present invention, a pane of glass having disposed thereon any of the multiple layer polymers of the present invention is manufactured using a vacuum deairing non-autoclave process embodiment described in U.S. Pat. No. 5,536,347. In various other embodiments, a nip roll non-autoclave process embodiment described in published U.S. application 2003/0148114 is used.

In addition to the embodiments given above, other embodiments comprise a rigid glazing substrate other than glass. In these embodiments, the rigid substrate can comprise acrylic, Plexiglass®, Lexan®, and other plastics, such as polycarbonate, that are conventionally used as glazings.

The present invention also includes methods of preventing water ingress into a polymer sheet, comprising forming any of the multiple layer panels of the present invention having a moisture barrier layer.

The present invention also includes methods of manufacturing a multiple layer glass panel comprising laminating in a stack any of the multiple layer panels described herein comprising a moisture barrier layer.

Various polymer sheet and/or laminated glass characteristics and measuring techniques will now be described for use with the present invention.

The clarity of a polymer sheet, and particularly a poly (vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to ASTM method D 1925, "Standard Test Method for Yellowness Index of Plastics" from spectrophotometric light transmittance in the visible spectrum directly on prepared samples. In various embodiments of the present invention, a polymer sheet can have a yellowness index of 12 or less, 10 or less, or 8 or less.

Using the CIELAB system, a well-known international standard for color measurement, the color of an object under fixed viewing conditions can be defined. A set of dimensionless coordinates L*, a*, b* are used to define a color's hue and intensity. These coordinates are measured according to instructions provided in the publication "Standard Practice for Computing the Colors of Objects by Using the CIE System," ASTM E 308-01. The wavelength range is between 400 nm and 700 nm, at a wavelength interval of 20 nm. The coordinate L* is used to measure the lightness or darkness of a color. White is denoted by L*=100 and black is denoted by L*=0. The coordinate a* measures the level of green or red color in the object, and the coordinate b* measures the level of blue or yellow in the object. ΔE values are determined according to $\Delta E^2 = \Delta L^2 + \Delta a^2 + \Delta b^2$.

Peel adhesion is a measure of the adhesion between a polymer sheet and a polymer film, and can be determined according to the following procedure: a laminate having a polymer film in contact with a polymer sheet is cut to allow a 4 cm wide strip of polymer film to be peeled off of the polymer sheet at an angle of 90° and a speed of 127 mm/minute. The peel force is measured by an Instron load cell model A2-38 which is calibrated at 0.0 and 5.0 kg prior to testing.

The "water ingress" through a moisture barrier layer can be determined according to the following water ingress test, which results in a "relative water ingress value": Moisture content (% $H_2O$) in a polymer sheet is measured by the following method immediately after lamination (% $H_2O$ initial) and then after 14 days of conditioning the laminate at 54° C./90%-100% relative humidity (% $H_2O$ final):

1) A NIR spectrophotometer is used to scan a laminated sample having a polymer sheet and a moisture barrier layer over the wavelengths 1975 nanometers to 1550 nanometers.
2) Transmission maxima values occur at 1875 nanometers and 1630 nanometers. Minima values occur at 1925 nanometers and 1695 nanometers. Exact wavelengths of minima and maxima will vary slightly due to polymer sheet formulation, thickness, and glass variables.
3) The transmission values obtained above are converted to absorbance using the formula, Absorbance=log (Transmittance$^{-1}$)

4) % $H_2O$ is calculated using the formula % $H_2O$=(Coefficient×Absorption Ratio−C), where C and Coefficient are determined as described below, and Absorption Ratio is determined using the following formula:

$$AbsorptionRatio = \frac{Absorbance\ @\ 1925 - Absorbance\ @\ 1875}{Absorbance\ @\ 1695 - Absorbance\ @\ 1630}.$$

The relative water ingress value for the moisture barrier layer is then computed to be % $H_2O$ final−% $H_2O$ initial.

To determine C and Coefficient, a set of laminates is prepared, wherein each laminate is formed from a single type of glass and a single type of polymer sheet and a single type of polymer film. Each polymer sheet has a different, known moisture content. Each laminate (glass//polymer sheet//polymer film) in the set is then measured for Absorption Ratio, as described above, and the results are noted as moisture content versus Absorption Ratio. A linear regression is performed on the data, and the y-intercept and slope of the resulting line are C and the Coefficient, respectively, for that particular combination of glass and polymer sheet. C and Coefficient are determined for each different glass/polymer sheet combination.

EXAMPLE 1

Seven multiple layer glass panels are fabricated and placed in a conditioning cabinet set at 54° C. at 90%-100% relative humidity for 14 days. The table below provides specifications for each panel. Each panel is a three layer laminate having the following layout: Glass//polymer sheet//polymer film//moisture barrier layer. The glass layers are 2.29 mm (0.090 inches) thick. Polymer sheets are each formed from plasticized poly (vinyl butyral) having a residual poly(vinyl alcohol) content of about 18.7% and about 39 phr of triethylene glycol bis-(2-ethyl)hexanoate. Polymer films are formed from poly(ethylene terephthalate). Polymer sheets have a thickness of 0.76 mm (0.030 inches).

| Panel Designation | Polymer Film Thickness | Moisture barrier Layer Composition | Barrier Layer Thickness | Laminate Layout |
|---|---|---|---|---|
| 1 | 50.8 μm (2 mil) | No Moisture Barrier Layer | N/A | Glass//polymer sheet//polymer film |
| 2 | 25.4 μm (1 mil) | Indium Oxide | 15 nm | Glass//polymer sheet//moisture barrier layer//polymer film |
| 3 | 178 μm (7 mil) | No Moisture Barrier Layer | N/A | Glass//polymer sheet//polymer film//hardcoat |
| 4 | 178 μm (7 mil) | No Moisture Barrier Layer | N/A | Glass//polymer sheet//polymer film//hardcoat |
| 5 | 165 μm (6.5 mil) | Indium Oxide | 15 nm | Glass//polymer sheet// polymer film//moisture barrier layer//hardcoat |
| 6 | 178 μm (7 mil) | Indium Tin Oxide | 20 nm | Glass//polymer sheet// moisture barrier layer//polymer film |
| 7 | 178 μm (7 mil) | Indium Tin Oxide | 20 nm | Glass//polymer sheet// moisture barrier layer//polymer film//hardcoat |

Figure 2:
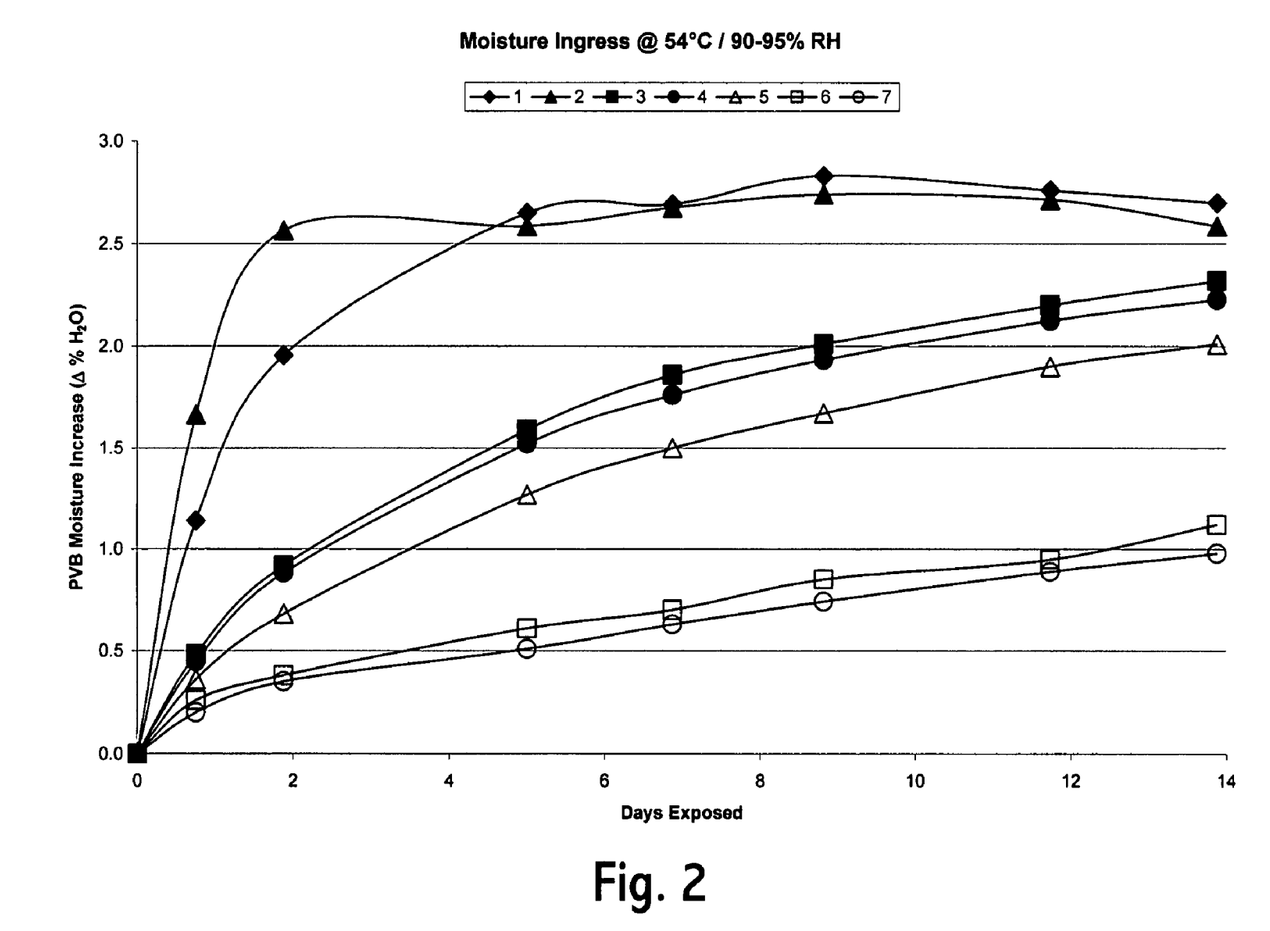
FIG. 2 is a graph representing the moisture content of various polymer sheets over time.

The polymer sheets are analyzed for moisture content at least once per day according to the method described above. The results are shown graphically in FIG. 2 and are summarized in the table below:

| Panel Designation | % $H_2O$ Initial | % $H_2O$ Final | Relative Water Ingress Value |
|---|---|---|---|
| 1 | 0.23 | 2.93 | 2.70% |
| 2 | 0.24 | 2.83 | 2.59% |
| 3 | 0.24 | 2.56 | 2.32% |
| 4 | 0.36 | 2.59 | 2.23% |
| 5 | 0.44 | 2.45 | 2.01% |
| 6 | 0.34 | 1.46 | 1.12% |
| 7 | 0.41 | 1.39 | 0.98% |

EXAMPLE 2

Various multiple layer glass panels incorporating a barrier layer are tested for % haze, yellowness index, peel adhesion, color, abrasion resistance, and light transmission. Results are given in the table below. Initial and Final refer to the properties as measured before and after the 14 day conditioning at 54° C./90-100% relative humidity and $C^2=a^2+b^2$.

| Panel Designation | Time Taken | % Haze | Yellowness Index | Peel Adhesion (N/cm) | ΔE | Change in % Haze | Transmission of Visible Light |
|---|---|---|---|---|---|---|---|
| 4 | Initial | 1.3 | 2.65 | 19.7 | n/a | 3.1 | 88.13 |
|   | Final | 1.9 | 2.67 | 3.2 | 0.07 | 3.2 | 87.94 |
| 5 | Initial | 1.5 | 4.28 | n/a | n/a | 1.5 | 87.27 |
|   | Final | 1.8 | 4.28 | n/a | 0.08 | 1.6 | 87.37 |
| 7 | Initial | 0.8 | 4.38 | 18.8 | n/a | 2.2 | 87.36 |
|   | Final | 1.2 | 4.58 | 11.6 | 0.04 | 2.0 | 87.43 |

| Panel Designation | Time Taken | L* | a* | b* | C* | ΔE |
|---|---|---|---|---|---|---|
| 4 | Initial | 95.21 | −1.15 | 1.75 | 2.09 | n/a |
|   | Final | 95.14 | −1.16 | 1.76 | 2.11 | 0.07 |
| 5 | Initial | 94.85 | −1.30 | 3.02 | 3.02 | n/a |
|   | Final | 94.90 | −1.32 | 2.98 | 2.98 | 0.08 |
| 7 | Initial | 94.89 | −1.36 | 2.88 | 3.18 | n/a |
|   | Final | 94.92 | −1.35 | 2.90 | 3.20 | 0.04 |

By virtue of the present invention, it is now possible to provide multiple layer glass panels, for example glass//poly(vinyl butyral)//poly(ethylene terephthalate)//Titanium Oxynitride//Hardcoat panels, that have excellent impact resistance and optical properties as well as a reduced susceptibility to ingress of water.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, a polymer sheet can be formed comprising plasticizer in any of the ranges given and combined with any of the ranges given for moisture barrier thickness, to form many permutations that are within the scope of the present invention.

Figures are understood to not be drawn to scale unless indicated otherwise.

Each reference, including journal articles, patents, applications, and books, referred to herein is hereby incorporated by reference in its entirety.

I claim:

1. A multiple layer glass panel, consisting essentially of:
a rigid substrate;
a polymer sheet disposed in contact with said rigid substrate; and,
an outer layer directly bonded to said polymer sheet, wherein said outer layer consists of a polymer film and a moisture barrier layer, wherein said outer layer is exposed to the environment, and wherein said moisture barrier layer has a thickness of less than 30 nanometers.

2. The panel of claim 1, wherein said polymer sheet comprises poly(vinyl butyral).

3. The panel of claim 2, wherein said rigid substrate is a single layer of glass, or a laminated glass panel having two layers of glass between which is disposed one or more layers of polymer.

4. The panel of claim 2, wherein said polymer film comprises polyester, polycarbonate, polyurethane, nylon, or acrylic.

5. The panel of claim 4, wherein said polyester film comprises poly(ethylene terephthalate).

6. The panel of claim 2, wherein said outer layer is oriented so that said moisture barrier layer is disposed in contact with said polymer sheet.

7. The panel of claim 2, wherein said outer layer is oriented so that said polymer film is disposed in contact with said polymer sheet.

8. The panel of claim 2, wherein said moisture barrier layer comprises a member selected from the group consisting of an oxynitride, indium oxide, indium tin oxide, aluminum oxide, or silicon oxide.

9. The panel of claim 8, wherein said moisture barrier layer comprises an oxynitride selected from the group consisting of Silicon Oxynitride, Aluminum Oxynitride, or Titanium Oxynitride.

10. The panel of claim 9, wherein said moisture barrier layer has a relative water ingress value of less than 1.5%.

11. A multiple layer glass panel, consisting essentially of:
a layer of glass;
a polymer sheet disposed in contact with said layer of glass; and,
an outer layer directly bonded to said polymer sheet, wherein said outer layer consists of a polymer film and a moisture barrier layer, wherein said outer layer is exposed to the environment, and wherein said moisture barrier layer has a thickness of less than 30 nanometers.

12. The panel of claim 11, wherein said polymer sheet comprises poly(vinyl butyral).

13. The panel of claim 12, wherein said polymer film comprises polyester, polycarbonate, polyurethane, nylon, or acrylic.

14. The panel of claim 12, wherein said polymer film comprises poly(ethylene terephthalate).

15. The panel of claim 12, wherein said outer layer is oriented so that said moisture barrier layer is disposed in contact with said polymer sheet.

16. The panel of claim 12, wherein said outer layer is oriented so that said polymer film is disposed in contact with said polymer sheet.

17. The panel of claim 12, wherein said moisture barrier layer comprises a member selected from the group consisting of an oxynitride, indium oxide, indium tin oxide, aluminum oxide, or silicon oxide.

18. The panel of claim 17, wherein said moisture barrier layer comprises an oxynitride selected from the group consisting of Silicon Oxynitride, Aluminum Oxynitride, or Titanium Oxynitride.

19. The panel of claim 18, wherein said moisture barrier layer has a relative water ingress value of less than 1.5%.

20. A multiple layer glass panel, consisting essentially of:
a rigid substrate;

a polymer sheet comprising poly(vinyl butyral), polyurethane, or poly(ethylene vinyl acetate) disposed in contact with said rigid substrate; and, an outer layer directly bonded to said polymer sheet, wherein said outer layer consists of a polymer film and a moisture barrier layer, wherein said outer layer is exposed to the environment, and wherein said moisture barrier layer has a thickness of less than 30 nanometers.

21. The panel of claim 20, wherein said rigid substrate is a single layer of glass, or a laminated glass panel having two layers of glass between which is disposed one or more layers of polymer.

22. The panel of claim 21, where said rigid substrate is a single layer of glass.

23. The panel of claim 20, wherein said polymer film comprises polyester, polycarbonate, polyurethane, nylon, or acrylic.

24. The panel of claim 23, wherein said polyester film comprises poly(ethylene terephthalate).

25. The panel of claim 20, wherein said outer layer is oriented so that said moisture barrier layer is disposed in contact with said polymer sheet.

26. The panel of claim 20, wherein said outer layer is oriented so that said polymer film is disposed in contact with said polymer sheet.

27. The panel of claim 20, wherein said moisture barrier layer comprises a member selected from the group consisting of an oxynitride, indium oxide, indium tin oxide, aluminum oxide, or silicon oxide.

28. The panel of claim 27, wherein said moisture barrier layer comprises an oxynitride selected from the group consisting of Silicon Oxynitride, Aluminum Oxynitride, or Titanium Oxynitride.

29. The panel of claim 28, wherein said moisture barrier layer has a relative water ingress value of less than 1.5%.

30. A method of preventing ingress of water into a polymer sheet layer in a multiple layer glass panel, comprising:
including in said multiple layer glass panel a moisture barrier layer, wherein said multiple layer glass panel consists essentially of:
a rigid substrate;
said polymer sheet, wherein said polymer sheet is disposed in contact with said rigid substrate; and,
an outer layer directly bonded to said polymer sheet, wherein said outer layer consists of a polymer film and said moisture barrier layer, and wherein said outer layer is exposed to the environment, and wherein said moisture barrier layer has a thickness of less than 30 nanometers.

* * * * *